(12) United States Patent
Gerard et al.

(10) Patent No.: US 11,912,382 B2
(45) Date of Patent: Feb. 27, 2024

(54) UNDERWATER POSITIONING SYSTEM

(71) Applicant: Vulcan Inc., Seattle, WA (US)

(72) Inventors: Rusty Allen Gerard, Bothell, WA (US); Richard Earl Simpkinson, Issaquah, WA (US); Omer Rosenbaum, Kirkland, WA (US)

(73) Assignee: Vulcan Inc., Seattle, WA (US)

( * ) Notice: Subject to any disclaimer, the term of this patent is extended or adjusted under 35 U.S.C. 154(b) by 554 days.

(21) Appl. No.: 16/825,986

(22) Filed: Mar. 20, 2020

(65) Prior Publication Data

US 2020/0298949 A1     Sep. 24, 2020

Related U.S. Application Data

(60) Provisional application No. 62/822,738, filed on Mar. 22, 2019.

(51) Int. Cl.
*B63C 11/48* (2006.01)
*B63B 22/00* (2006.01)
(Continued)

(52) U.S. Cl.
CPC .............. *B63C 11/48* (2013.01); *B63B 22/00* (2013.01); *B63G 8/001* (2013.01); *G01S 15/46* (2013.01); *G10K 11/006* (2013.01); *H04L 9/3213* (2013.01); *B63B 2022/006* (2013.01); *B63G 2008/004* (2013.01); *B63G 2008/008* (2013.01); *G01S 2015/465* (2013.01); *G01S 2201/07* (2019.08); *G01S 2201/08* (2019.08); *G01S 2205/04* (2020.05)

(58) Field of Classification Search
CPC ................. G01S 15/46; G01S 2201/07; G01S 2015/465; G01S 2201/08; G01S 2205/04; G10K 11/006; H04L 9/3213; B63B 22/00
See application file for complete search history.

(56) References Cited

U.S. PATENT DOCUMENTS 6,080,063 A    6/2000 Khosla
8,384,542 B1    2/2013 Merrill et al.
(Continued)

FOREIGN PATENT DOCUMENTS

CN    107897068 A    4/2018
JP    2017093425 A    6/2017
(Continued)

OTHER PUBLICATIONS

KR-20170139093-A (Machine Translation) (Year: 2016).*
(Continued)

*Primary Examiner* — Yuqing Xiao
*Assistant Examiner* — Christopher Richard Walker
(74) *Attorney, Agent, or Firm* — Davis Wright Tremaine LLP

(57) ABSTRACT

An underwater positioning system comprises a plurality of underwater beacons. A beacon, in response to a signal sent by an underwater vehicle, responds with a signal comprising one or more characteristics to identify the beacon. Components of an access algorithm are provided to the underwater vehicle. The access algorithm determines a location of the beacon based on the beacon's identity. A position of the vehicle is determined based at least in part on the location of the beacon.

19 Claims, 7 Drawing Sheets

(51) Int. Cl.
  *G10K 11/00* (2006.01)
  *G01S 15/46* (2006.01)
  *H04L 9/32* (2006.01)
  *B63G 8/00* (2006.01)

(56) References Cited

U.S. PATENT DOCUMENTS

| | | | |
|---|---|---|---|
| 9,317,916 B1 | 4/2016 | Hanina et al. | |
| 9,782,668 B1 | 10/2017 | Golden et al. | |
| D817,195 S | 5/2018 | Iyengar | |
| 10,143,925 B2 | 12/2018 | Middleton | |
| 10,192,126 B2 | 1/2019 | Yamanaka et al. | |
| 10,279,264 B1 | 5/2019 | Aghdaie et al. | |
| 10,579,869 B1 | 3/2020 | Xiong et al. | |
| 10,675,536 B2 | 6/2020 | Chen | |
| 10,839,203 B1 | 11/2020 | Guigues et al. | |
| 10,989,815 B2 * | 4/2021 | Dmitriev | G01S 19/45 |
| 11,036,303 B2 | 6/2021 | Rani et al. | |
| 11,132,606 B2 | 9/2021 | Taylor | |
| 11,249,179 B2 | 2/2022 | Hamasaki et al. | |
| 11,337,358 B2 | 5/2022 | Fletcher et al. | |
| 2003/0142587 A1 * | 7/2003 | Zeitzew | G01S 7/52004 |
| | | | 367/127 |
| 2006/0223635 A1 | 10/2006 | Rosenberg | |
| 2008/0170123 A1 | 7/2008 | Albertson et al. | |
| 2008/0176583 A1 * | 7/2008 | Brachet | H04W 4/029 |
| | | | 455/456.3 |
| 2009/0005140 A1 | 1/2009 | Rose et al. | |
| 2010/0156660 A1 * | 6/2010 | Lee | G01S 13/46 |
| | | | 340/8.1 |
| 2011/0216060 A1 | 9/2011 | Weising et al. | |
| 2011/0298827 A1 | 12/2011 | Perez | |
| 2011/0301934 A1 | 12/2011 | Tardif | |
| 2012/0079990 A1 | 4/2012 | Fuhr et al. | |
| 2012/0083325 A1 | 4/2012 | Heatherly | |
| 2012/0243375 A1 | 9/2012 | Melvin, II et al. | |
| 2012/0281181 A1 | 11/2012 | Chen et al. | |
| 2013/0077820 A1 | 3/2013 | Marais et al. | |
| 2013/0261856 A1 * | 10/2013 | Sharma | B61L 25/026 |
| | | | 701/19 |
| 2014/0032034 A1 | 1/2014 | Raptopoulos et al. | |
| 2014/0153794 A1 | 6/2014 | Varaklis et al. | |
| 2014/0253590 A1 | 9/2014 | Needham et al. | |
| 2014/0267008 A1 | 9/2014 | Jain et al. | |
| 2014/0310595 A1 | 10/2014 | Acharya et al. | |
| 2015/0177842 A1 | 6/2015 | Rudenko | |
| 2016/0078289 A1 | 3/2016 | Michel et al. | |
| 2016/0086349 A1 | 3/2016 | Shotton et al. | |
| 2016/0180468 A1 | 6/2016 | Buss et al. | |
| 2016/0243434 A1 | 8/2016 | Yim et al. | |
| 2016/0328604 A1 | 11/2016 | Bulzacki | |
| 2017/0144756 A1 | 5/2017 | Rastgaar Aagaah et al. | |
| 2017/0148339 A1 | 5/2017 | Van Curen et al. | |
| 2017/0168586 A1 | 6/2017 | Sinha et al. | |
| 2017/0190051 A1 | 7/2017 | O'Sullivan et al. | |
| 2017/0193708 A1 | 7/2017 | Lyons et al. | |
| 2017/0208493 A1 | 7/2017 | Masson et al. | |
| 2017/0212210 A1 | 7/2017 | Chen et al. | |
| 2017/0227638 A1 * | 8/2017 | Nicoletti | H04B 11/00 |
| 2017/0234966 A1 * | 8/2017 | Naguib | G01S 13/86 |
| | | | 367/117 |
| 2017/0280678 A1 | 10/2017 | Jones et al. | |
| 2017/0293742 A1 | 10/2017 | Sadeghi et al. | |
| 2017/0293824 A1 | 10/2017 | Chen et al. | |
| 2017/0313421 A1 | 11/2017 | Gil | |
| 2017/0344859 A1 | 11/2017 | Mo | |
| 2017/0358144 A1 | 12/2017 | Schwarz et al. | |
| 2018/0018861 A1 | 1/2018 | Locke et al. | |
| 2018/0020329 A1 * | 1/2018 | Smith | H04W 4/08 |
| 2018/0024641 A1 | 1/2018 | Mao et al. | |
| 2018/0093186 A1 | 4/2018 | Black et al. | |
| 2018/0122043 A1 | 5/2018 | Energin et al. | |
| 2018/0213713 A1 | 8/2018 | Zito, Jr. et al. | |
| 2018/0263170 A1 | 9/2018 | Aghai et al. | |
| 2018/0310532 A1 | 11/2018 | Hickson et al. | |
| 2018/0330810 A1 | 11/2018 | Gamarnik et al. | |
| 2019/0000350 A1 | 1/2019 | Narayan et al. | |
| 2019/0038222 A1 | 2/2019 | Krimon et al. | |
| 2019/0061890 A1 | 2/2019 | Fiorello | |
| 2019/0091582 A1 | 3/2019 | Reiche, III et al. | |
| 2019/0124893 A1 | 5/2019 | Bolen | |
| 2019/0217198 A1 | 7/2019 | Clark et al. | |
| 2019/0221035 A1 | 7/2019 | Clark et al. | |
| 2019/0294881 A1 | 9/2019 | Polak et al. | |
| 2019/0325605 A1 | 10/2019 | Ye et al. | |
| 2019/0383903 A1 | 12/2019 | Chao et al. | |
| 2020/0005028 A1 | 1/2020 | Gu | |
| 2020/0050342 A1 | 2/2020 | Lee | |
| 2020/0055570 A1 * | 2/2020 | Brink | B63B 22/18 |
| 2020/0057425 A1 | 2/2020 | Seibert et al. | |
| 2020/0160535 A1 | 5/2020 | Ali Akbarian et al. | |
| 2020/0234231 A1 * | 7/2020 | Stevenson | G01S 19/14 |
| 2020/0238177 A1 | 7/2020 | Black et al. | |
| 2020/0284903 A1 * | 9/2020 | Zach | G01S 7/56 |
| 2020/0289922 A1 | 9/2020 | McCoy et al. | |
| 2020/0394393 A1 | 12/2020 | Kraft et al. | |

FOREIGN PATENT DOCUMENTS

| | | | |
|---|---|---|---|
| KR | 20170139093 A | * | 5/2016 |
| KR | 20170139093 A | | 12/2017 |
| WO | 2017132563 A1 | | 8/2017 |

OTHER PUBLICATIONS

Kramar, V., et al., "Particularities of Visualisation of Medical and Wellness Data Through a Digitial Patient Avatar", 14th Conference of Open Innovation Association FRUCT, 2013, 12 pages.

International Search Report and Written Opinion dated Jul. 23, 2020, Patent Application No. PCT/US2020/016882, 19 pages.

International Invitation to Pay Additional Fees dated Jun. 2, 2020, in International Patent Application No. PCT/US2020/016882, filed Feb. 5, 2020, 21 pages.

Charles, "GPS Goes Mainsteam," NPR, Dec. 26, 2007, 7 pages.

Langley et al., "Approaches To Machine Learning," Department of Computer Science Carnegie-Mellon University, Feb. 16, 1984, 28 pages.

Ocean News, "Meet RangerBot, Robot Reef Protector," Sep. 4, 2018, 7 pages.

Chamberland, et al., "New Seeding Approach Reduces Costs and Time to Outplant Sexually Propagated Corals for Reef Restoration," www.nature.com/Scientificreports, Dec. 22, 2017, 12 pages.

* cited by examiner

UNDERWATER POSITIONING SYSTEM

CROSS-REFERENCE TO RELATED APPLICATIONS

This application claims the benefit of U.S. Provisional Patent Application No. 62/822,738, filed Mar. 22, 2019, the disclosure of which is herein incorporated by reference in its entirety.

BACKGROUND

Increasingly, a wide variety of applications incorporate data obtained via the global positioning system ("GPS"). However, no comparable solution is readily available for underwater applications.

BRIEF DESCRIPTION OF THE DRAWINGS

Various techniques will be described with reference to the drawings, in which.

DETAILED DESCRIPTION

Various techniques described herein relate to underwater and oceanographic applications, including those related to underwater navigation and the supply of power to vehicles and devices that operate underwater.

In an embodiment disclosed herein, a plurality of beacons are submerged underwater. The beacons are configured to provide an identifying response when pinged using acoustic or optical transmissions. By correlating the identity of two or more beacons with known locations of the respective beacon, an underwater vehicle or device can triangulate a position. In a further aspect, components of an access algorithm are provided to the device enable utilization of the beacons for positioning. The algorithm, in at least one embodiment, is capable of authorizing, de-authorizing, or adjusting access to the positioning system, even when the device, and in some embodiments the beacon, are unable to communicate with the remote server.

In an embodiment disclosed herein, an underwater power station is provided. The power station is used, in at least one embodiment, to charge an underwater device. Components of an access algorithm are provided by a remote server to a device that will operate in an underwater or oceanic environment. Access to the underwater power station is determined using the access algorithm. The access algorithm is capable of authorizing, de-authorizing, or adjusting access to the underwater power station, even when the device, and in some embodiments the power station, are unable to communicate with the remote server.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: the provision of an underwater positioning system, and the provision of a recharging capability for underwater vehicles and devices.

Figure 1:
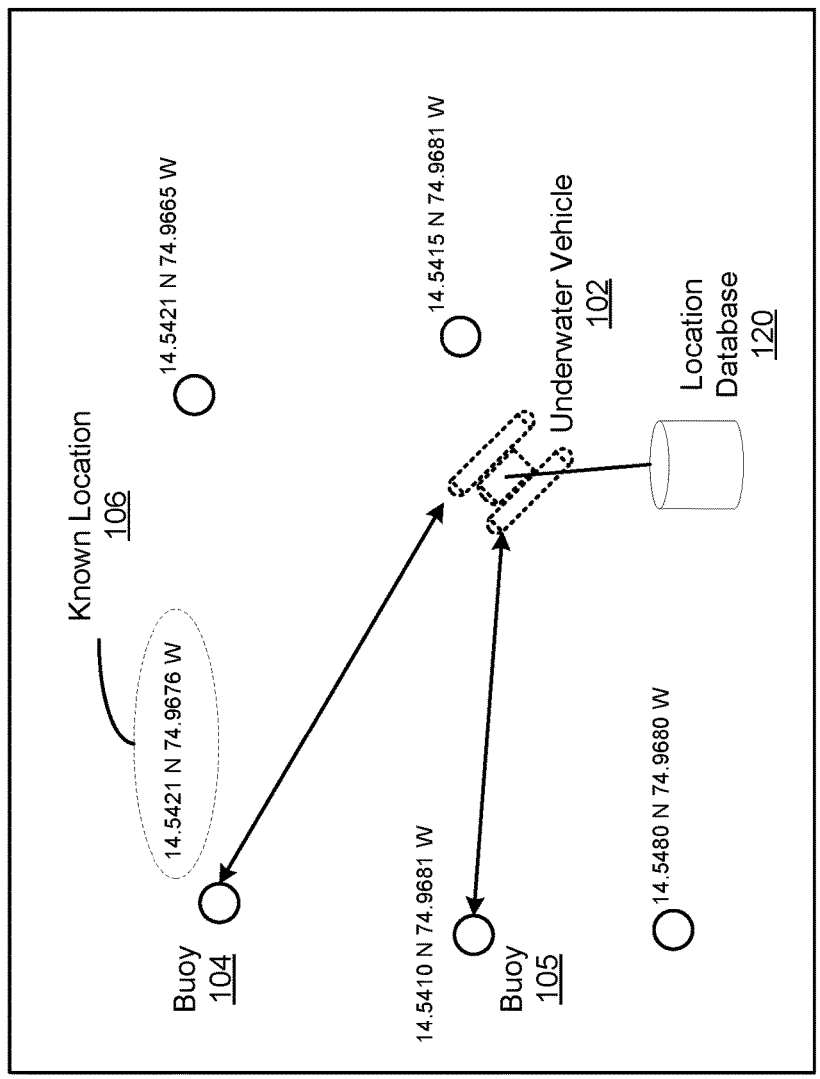
FIG. 1 illustrates aspects of an underwater positioning system, in accordance with an embodiment.

FIG. 1 illustrates aspects of an underwater positioning system, in accordance with an embodiment. In the example 100 of FIG. 1, a system of buoys is distributed across the surface of a body of water. Each buoy may have a beacon attached to it, submerged below the water line. The number and distribution of said buoys may be based on various factors such as the transmission and reception capabilities of the attached beacons. For example, the buoys may be selected and distributed such that, for a given operating area of an underwater device, a suitable number of beacons is likely to be within signal range of the device.

In embodiments, the location of each buoy is known. For example, a buoy 104 and its respective beacon may reside at a known location 106, such as 14.5421 N 74.9676 W. In at least one embodiment, information indicative of the location is stored by a remote database. In at least one embodiment, an underwater vehicle 102 comprises a database 120 which is synchronized with the remote database. The synchronization may occur, for example, when the vehicle 102 is surfaced or otherwise able to communicate with the remote database. In at least one embodiment, the remote database and database 120 comprise location data indexed by identifier information for a buoy or its respective beacon. This allows the vehicle to determine the location of a buoy or its beacon, using the database, once the identifier of the buoy or its beacon has been obtained.

In at least one embodiment, the buoys store and/or maintain their respective locations, and are capable of transmitting this location information to a vehicle 102 while that vehicle is surfaced or is otherwise within communication range. This information is accompanied by buoy identifying information, so that the vehicle's database 120 may store location information indexed by buoy identifier.

In embodiments, an underwater vehicle 102 transmits a signal to buoy 104, and to buoy 105. One or more signals may be transmitted to obtain one or more replies. For example, the underwater vehicle 102 may transmit an acoustical ping which is actively or passively responded to by two or more of the buoys 104, 105. In at least one embodiment, each response comprises information identifying the buoy. The underwater vehicle then uses the identifying information to determine a location of the buoys. For example, the underwater vehicle 102 may determine, based on a database 120, that the location of one nearby buoy 104 is 14.5421 N 74.9676 W, and that the location of another nearby buoy 105 is 14.5410 N 74.9681 W. The underwater vehicle can then determine its own location by triangulation. In at least one embodiment, time-to-reply information may also be used by the vehicle to determine a position.

In at least one embodiment, an underwater vehicle or other underwater device is able, while underwater, to determine its location using the techniques described above and herein. For example, an underwater device may determine its location by obtaining information indicative of the identity of a beacon, and then obtain information indicative of the location of the underwater beacon by mapping from the identity to the beacon location, and then triangulating its own position. Moreover, these steps may be accomplished, in at least one embodiment, without contact with a server or other device on the surface.

Figure 2:
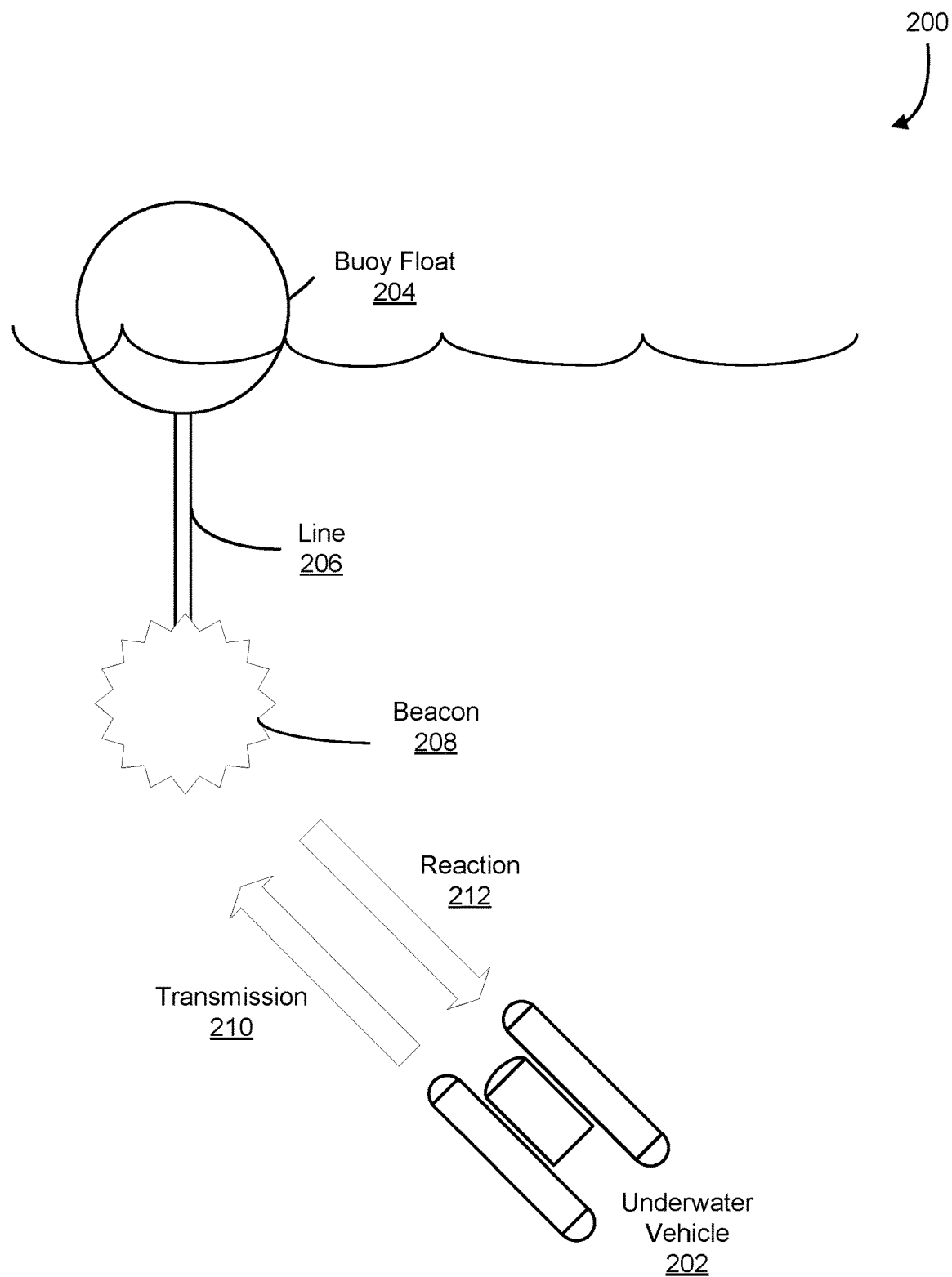
FIG. 2 illustrates aspects of an underwater positioning system, in accordance with an embodiment.

FIG. 2 illustrates aspects of an underwater positioning system, in accordance with an embodiment. As depicted by the example 200 of FIG. 2, a buoy may comprise a float 204 to keep it on or near the surface of the water, or at a desired depth. The float 204 may be attached by a line 206 to a beacon 208. The beacon 208 may be submerged below the water surface at a depth suitable to local conditions, based on factors such as the presence of a thermocline, an operating depth of an underwater vehicle 202, and so forth. In at least one embodiment, depth is selected to improve signal reception and transmission with the vehicle 202, based on predicted operating locations and depths.

In at least one embodiment, a transmission 210 from an underwater vehicle 202 is an acoustic transmission, such as a sonar ping. Note that although FIG. 2 is described in relation to an underwater vehicle 202, other devices may function in a similar manner to obtain position information. Examples of other devices include aquatic sensors, anchors, diving bells, scuba diving equipment, aquatic-safe watches, smartphones, and other handheld electronic devices, and so on. Accordingly, the various operations attributed herein to an underwater vehicle 202 may also be performed by other devices, including those devices mentioned, to obtain position information while underwater.

In at least one embodiment, a transmission 210 is an acoustic transmission, such as a sonar ping. In at least one embodiment, the transmission 210 is a directional acoustic transmission. In other embodiments, the transmission 210 is an omnidirectional transmission. Other directional patterns may be employed.

In at least one embodiment, a transmission 210 is an optical transmission, such as a wireless optical transmission based on lasers. In at least one embodiment, a transmission 210 is a radio-frequency transmission.

In at least one embodiment, a reaction 212 of the beacon 208 to a transmission 210 is acoustic. For example, the reaction 212 may be an acoustic reflection of the transmission 210. In at least one embodiment, a reaction 212 of the beacon 208 is an optical or radio-frequency transmission.

In at least one embodiment, the shape of the beacon 208 causes the beacon 208 to generate, when struck by an acoustical ping (e.g., from transmission 210), a reflective signature. The reaction 212, in such cases, comprises this signature.

The pattern of the reflective signature can then be used the underwater vehicle 202 to identify the buoy. Note that each buoy does not necessarily have to produce a unique reflective signature, provided that the underwater vehicle 202 can still discern the location of a buoy based on its signature. For example, the signatures may be unique within a respective operating area of the underwater vehicle, or are located in a pattern that allows for two buoys with the same signature to be discerned from each other based on other information, such as an estimated distance from the buoy. Estimated distance can be inferred based on response time.

In at least one embodiment, the reflective signature is at least locally unique, such that no other buoy within the vehicle's 202 operating area would produce the same signature, given the same transmission 210.

In at least one embodiment, the reflective signature is not locally unique, but is usable to discern the unique identity of the buoy 204 given additional information, such as response time for the reaction 212, or an estimated position of the vehicle 202. A signature may be sufficiently unique when it can be used, with or without additional information, to identify a particular beacon 208 or its associated buoy.

In at least one embodiment, a shape, material, texture, or coating on the beacon alters the beacon's 208 reflective signature. In at least one embodiment, the beacon is composed of or otherwise comprises a material that alters the beacon's 208 reflective signature. In at least one embodiment, the beacon is one of a plurality of shapes that each alters the beacon's 208 reflective signature. By using or applying different materials, textures, shapes, or coatings on beacons within an operating area, the reflective signature of each beacon can be made sufficiently unique. The use of different materials, textures, shapes, or coatings can be used to cause an acoustic ping to generate an acoustic reflection with a combination of characteristics that is sufficient to identify a particular beacon.

In at least one embodiment, the shape of beacon 208 is configured so as to produce a reflective signature that is at least locally unique. Different shapes may be used for respective beacons in an operating area, so that the reflective signatures of each beacon can be made sufficiently unique.

In at least one embodiment, a combination of factors is employed to produce a reflective signature that is at least locally unique. For example, within an operating area, each beacon can have a unique permutation of shape, coating, texture, and material composition. Each of these may contribute to a particular beacon's signature, and by using different combinations with each beacon within an operating area, it can be ensured that the signature generated by each beacon is sufficiently unique.

In some embodiments, the reaction 212 comprises generation of an active acoustic signal, such as an acoustic signal generated in response to the transmission 210 by a speaker included in the beacon 208. The acoustic signature of this response can be made sufficiently unique by being based on a signal selected to produce a unique signature.

In embodiments, the transmission 210 comprises an optical transmission. The wavelength or wavelengths of the optical transmission may be based on factors such as the typical distance of the transmission 210, the water conditions, and so forth. Certain wavelengths may be better suited for certain operating conditions. Examples of optical transmissions include those used in conjunction with wireless optical communications, underwater wireless laser transmissions, and so on.

In at least one embodiment, a shape, material, texture, or coating of the beacon causes an optical reflection, generated by transmission 210 striking the beacon, to produce a reflection whose signature is at least locally unique.

In at least one embodiment, the reaction 212 comprises an active acoustic, optical, or radio transmission, using a transmitter similar to what some embodiments may employ regarding the initiating transmission 210. In at least one embodiment, the reaction 212 comprises a signal encoded in the actively-generated acoustic, optical, or radio transmission. The signal may comprise encoded information sufficient to allow the vehicle to uniquely identify the buoy.

In at least one embodiment, the underwater vehicle 202 uses a database to derive a location of a buoy from the identifier obtained from the signal produced by the corresponding beacon 208. In at least one embodiment, a unique identifier of the beacon is obtained from the reaction 212. As explained herein, the unique identifier can be obtained in a variety of ways. Once obtained, the underwater vehicle 202 may locate an entry in a database which maps from unique identifiers to buoy locations. Note that since the buoy 204 and beacon 208 are connected by line 206, their positions will generally be correlated, except for depth (since the beacon 208 is at some known depth below the buoy 204), and for some offset that might be introduced due to currents and waves.

In some embodiments, the reaction 212 comprises a signal which includes information directly indicative of the buoys location, such as information specifying the buoy's latitude, longitude, and depth. In such cases, the underwater vehicle 202 may process a reaction 212 signal to obtain the beacon's position.

In at least one embodiment, the underwater vehicle 202 proceeds to determine its own location once it has obtained the location of the buoy 204 or beacon 208. If only one such location is known, the underwater vehicle 202 can determine an approximate location based on the location of the buoy 204 or beacon 208 and the response time of the reaction 212. If two or more buoy/beacon locations are known, the underwater vehicle 202 can determine a more precise location by triangulation.

In at least one embodiment, access to an underwater positioning system is controlled through an authorization process. In an underwater environment, where communication with the surface is limited, authorization may be a particularly challenging problem.

Figure 3:
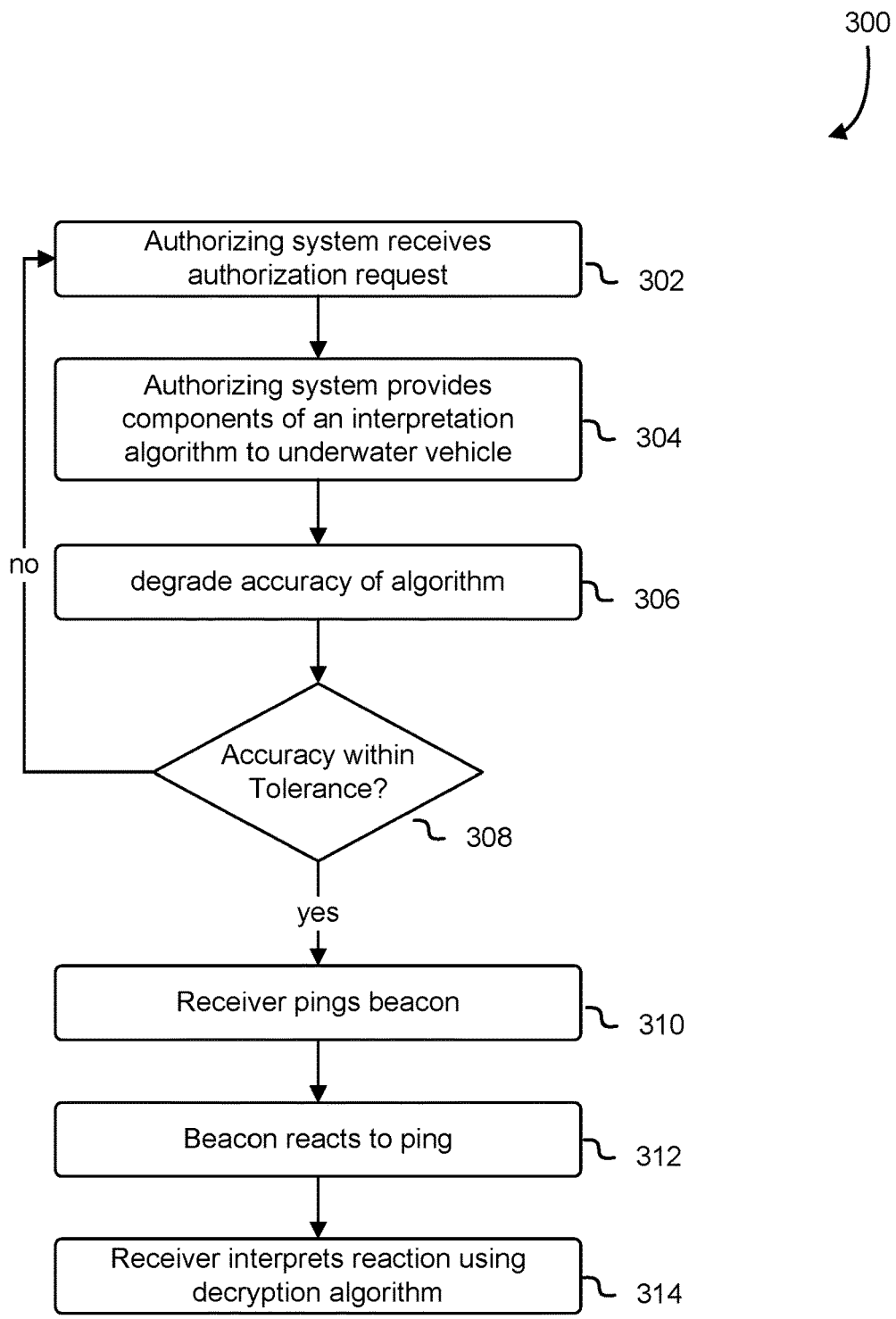
FIG. 3 illustrates an example process for authorizing use of an underwater positioning system, in accordance with an embodiment.

FIG. 3 illustrates an example process 300 for authorizing use of an underwater positioning system, in accordance with an embodiment. Due to the underwater environment, typical approaches to authorizing access to the system may be unsuitable. For example, it may be difficult or impossible for an underwater device to contact a remote server and perform conventional authorization methods, such as validating a user name and password. Similarly, communication with a beacon or surface station may be impractical. Even when an acoustical ping or other communication method might be used to trigger a response from the beacon, more extended communication, such as might be required to perform authorization, may be impractical due to power or bandwidth limitations. Moreover, the beacon may also be unable to communicate with a remote server, and would consequently be unable to make up-to-date decisions on whether or not authorization should be granted.

Although FIG. 3 is illustrated as a sequence of operations, the depicted sequence should not be construed in a manner which would limit the scope of potential embodiments to only those embodiments that conform to the depicted sequence. For example, in various embodiments, the depicted operations may be reordered or performed in parallel, except where the depicted sequence is logically required, such as when the output of one step is the input to a subsequent step.

In at least one embodiment, an access and control mechanism for an underwater positioning system is implemented in part by an authorization system comprising a remote server, and in part by a vehicle or other device which will attempt, when underwater, to determine its position using a system such as the buoy and beacon system described in relation to FIGS. 1-2.

At 302, the remote server receives an authorization request. The authorization request indicates that a vehicle, or other devices, wishes to make use of the underwater positioning system. In at least one embodiment, this operation is performed while the vehicle, or other device, is at the surface or otherwise has the ability to communicate with the authorizing system. As noted, communication with the remote server may be prevented when the vehicle is at depth, but there may be locations, such as on the surface or near designated underwater locations, where communication with the remote server is made possible. For example, a communications relay may be positioned at a known location underwater, and an underwater vehicle may communicate with the remote server by navigating to and utilizing the relay station.

At 304, the authorizing system provides one or more components of an access algorithm. In at least one embodiment, the access algorithm provides interpretation capabilities, e.g. the capability of identifying a beacon and or determining the location of the beacon. In at least one embodiment, the components include a set of processor-executable instructions for performing the algorithm. In at least one embodiment, the underwater vehicle or other device has these instructions pre-stored, and the provided components comprise encrypted information used by the algorithm. Other examples of information that may be provided include encryption/decryption keys, and information mapping between beacon identity and beacon location. For example, in at least one embodiment, the information that is provided includes beacon location data that may be loaded into a local database included in the vehicle 102, such as the database 120 that is depicted in FIG. 1. This information may be encrypted, so that it is only accessible to the access algorithm.

In at least one embodiment, an access algorithm comprises a set of instructions that are executable by a vehicle, or other device, to obtain location data. In at least one embodiment, an access algorithm comprises instructions for generating a signal to send to an underwater beacon, such as instructions for generating an acoustic ping. In at least one embodiment, an access algorithm comprises instructions for identifying characteristics of a signal returned from an underwater beacon, such as an acoustic reflection generated in response to an acoustic ping. In at least one embodiment, an access algorithm comprises instructions for mapping signal characteristics to a beacon identifier. In at least one embodiment, an access algorithm comprises instructions for mapping from a beacon identifier to a beacon location. An access algorithm, in some embodiments, may comprise instructions for performing triangulation or otherwise determining device location, based on determined beacon locations. In at least one embodiment, an access algorithm comprises instructions for determining a level of access to a location service, such as an amount of accuracy to be provided. In at least one embodiment, an access algorithm comprises instructions for determining whether or not some aspect of the operation of the algorithm should be degraded, and for causing some aspect of the operation to be degraded based on this determination.

In at least one embodiment, an access algorithm processes a signal obtained from the reaction of a beacon to obtain a location of the beacon, and obtains an identifier of the beacon from the processing.

In at least one embodiment, the signal obtained from the reaction of a beacon reflects one or more characteristics of the beacon. In response to an acoustic ping, for example, the acoustic reflection might comprise one or more distinct characteristics based on the shape, texture, material, or coating of the beacon. The access algorithm may quantify these characteristics and combine them to form an identifier. For example, in an embodiment a beacon might have one of four possible shapes, producing signal characteristics $C_{shape-1}$ through $C_{shape-4}$. A given beacon with might therefore be associated with identifiers $C_{shape-1}=ID_1$, $C_{shape-2}=ID_2$, and so forth. If a beacon in this embodiment may also have one of two possible coatings, producing signal characteristics $C_{coat-1}$ and $C_{coat-2}$, there might be eight possible identifiers, e.g. $C_{shape-1, coat-1}=ID_1$, $C_{shape-1, coat-2}=ID_2$, and so forth. The identifier can then be used to determine a location of the beacon, based on data pre-loaded into a local database.

In at least one embodiment, a signal returned from a beacon comprises an encoded identifier, such as a globally unique identifier ("GUID"). This might be the case, for example, when a beacon actively transmits a response, rather than relying on an acoustic reflection. For example, in at least one embodiment, the signal comprises an encrypted GUID that has been assigned to the beacon. The encrypted GUID can be decrypted by the access algorithm. The access algorithm can then utilize a local database to obtain a corresponding location. For example, the local database can include an index which maps from the identifier to the beacon's location. This location can then be used to determine the vehicle's location. In some cases, the locations of additional beacons are also determined, and then used to calculate the underwater vehicle's position by triangulation.

At 306, the operation of the access algorithm is degraded. In at least one embodiment, this comprises decreasing accuracy of the location information it provides, based on an amount of time that has elapsed since authorization to use the algorithm was provided. In other embodiments, the operation of the algorithm is degraded by increasing the time required to complete, or by increasing power requirements necessary to complete the algorithm.

In at least one embodiment, the algorithm implements the operational degrading, based at least in part on the provided components. For example, the provided components may include encrypted information indicating when access was provided. The algorithm can then execute in view of that information, and adjusts accuracy, response time, or power requirements accordingly.

In at least one embodiment, the access algorithm degrades its operation based, at least partially, on encrypted information provided to the vehicle as a component of the access algorithm. For example, the underwater vehicle can be provided with an encrypted authorization token while in communication with a remote server. The encrypted authorization token can include information indicative of the parameters according to which the vehicle is authorized to use the location service, and may further include information indicative of a time at which authorization was granted. Furthermore, the encrypted information can include parameters indicating how the location service should degrade, or how quickly the service should degrade.

In at least one embodiment, the access algorithm degrades its operation over time, measured from a starting point which corresponds to the time that components of the access algorithm were provided. In some embodiments, there may be an initial period during which operation does not degrade, followed by a period in which operation does degrade. In some embodiments, the algorithm ceases to function after some period of time. The periods of time in which performance or accuracy of the algorithm is constant, or during which the algorithm degrades, or ceases to function, can be predetermined. For example, in at least one embodiment, an underwater vehicle, or other device, may indicate an expected operational time when it requests access from the authorization system. The components of the algorithm that are provided to the vehicle can then be tailored, by the remote server, to indicate that operation of the algorithm should not be degraded during that expected operational time.

At 306, an underwater vehicle, or other device, determines if the accuracy of the algorithm is within a desired range. As described above, the interpretation algorithm may be configured to degrade, with respect to accuracy of the position information it provides, after some period of time. The underwater vehicle, or other device, may therefore include functionality to determine whether the access algorithm is still operating within an acceptable tolerance range, as depicted at 308.

Alternatively, the underwater vehicle or other device, may determine if the algorithm will still function, relative to the time the components of the interpretation algorithm were provided to the underwater vehicle, or if the performance of the algorithm will still be within acceptable limits.

If the underwater vehicle or device determines that the interpretation algorithm is no longer operating within a suitable tolerance range, it may initiate a re-authorization process. These steps may correspond to those described in relation to steps 302 and 304. In at least one embodiment, these steps occur after the underwater vehicle surfaces, or at other times when communication with the authorizing service is available.

If the accuracy or performance of the algorithm remains within an acceptable range, the underwater vehicle may proceed to utilize the positioning system. At 310, the receiver (i.e., the underwater vehicle) pings one or more beacons, and the beacons react to the ping as described in relation to FIG. 2. Here, the term ping refers to a transmission 210 of the sort depicted in FIG. 2.

At 312, the beacon reacts to the ping by sending back a reaction signal, similar to the reaction signals described with respect to FIG. 2. The receiver, e.g., the underwater vehicle, may then use the interpretation algorithm to interpret the beacon reactions and obtain a location, as depicted by element 314.

In at least one embodiment, degraded operation of the algorithm can include limitations designed to facilitate specific actions by the underwater vehicle. For example, an access algorithm can be configured to downgrade to a navigational mode which supports the vehicle in returning to a base or other location where communication with a remote server is available. Once at that location, the underwater vehicle can renew its access to the algorithm. In at least one embodiment, this navigational mode is enabled by the access algorithm returning navigational information, such as compass directions and distance, rather than a precise location. In at least one embodiment, location information is provided, but at reduced accuracy, until an underwater vehicle has navigated to a location where communication with a remote server is possible.

Figure 4:
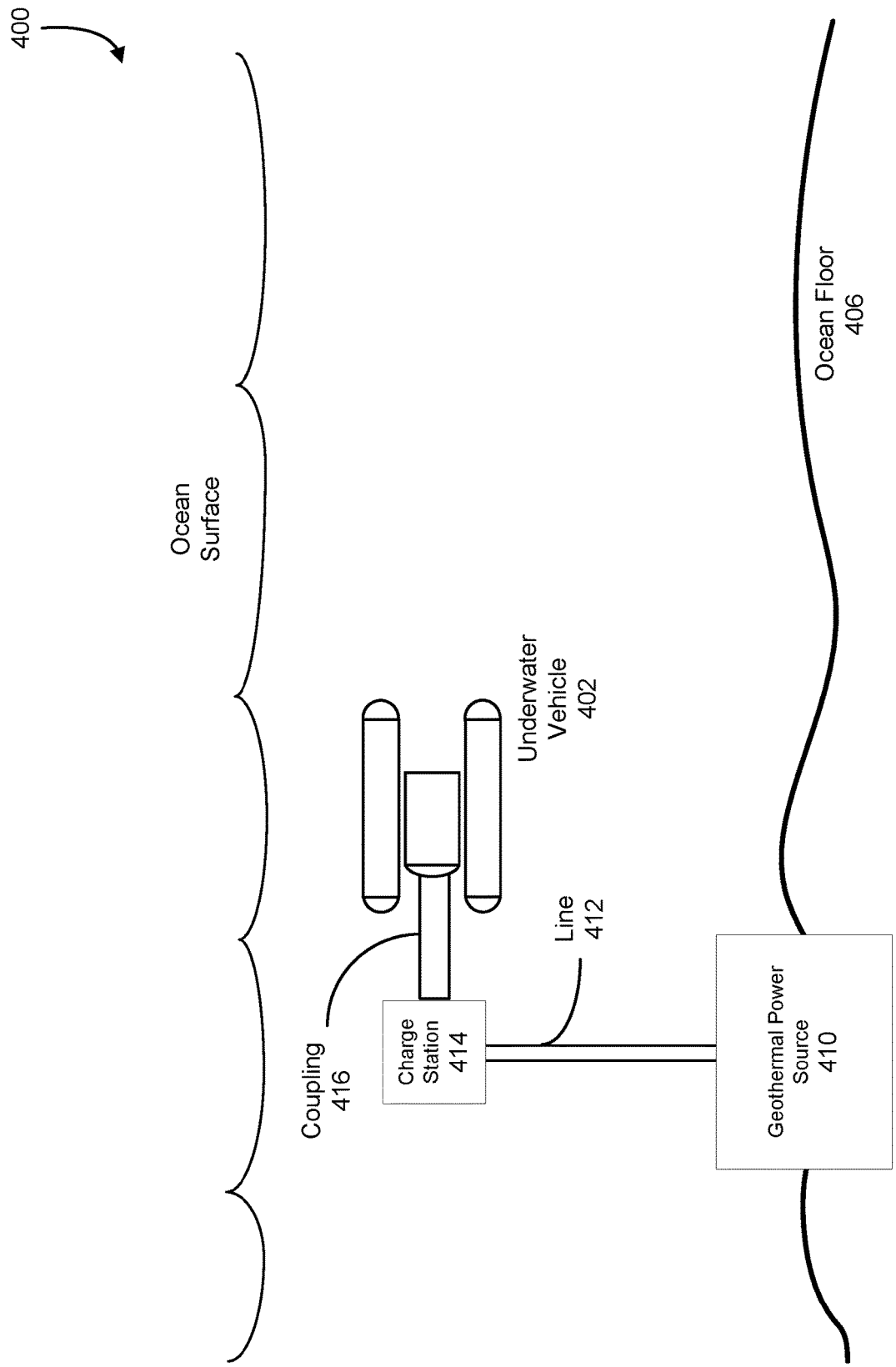
FIG. 4 illustrates an example system for charging an underwater vehicle, in accordance with an embodiment.

Another issue related to the operation of an underwater vehicle, or other underwater device, is the supply of power to such devices. FIG. 4 illustrates an example system for charging an underwater vehicle or device, in accordance with an embodiment. In the example 400 of FIG. 4, an underwater vehicle 402 is charged by a charging system comprising a geothermal power source 410, a charge station 414, and a line 412 coupling the power source 410 to the charge station 414. The line 412 conducts power from the power source 410 to the charge station 414. Note that although the example 400 depicts a geothermal power source 410, any of a variety of power sources might be utilized. In at least one embodiment, the power source may be attached to the ocean floor 406, or some other surface, while the charge station 414 is at a higher depth. In at least one embodiment, this arrangement allows the underwater vehicle to couple to the charge station 414 while remaining away from any adverse conditions that may be associated with the power source, 410, such as high heat, excessive pressure, water currents, silt, vegetation, and so forth. In at least one embodiment, the depth of the charge station 414 is such that it allows an underwater vehicle to avoid or reduce changes of depth needed to connect to the charge station 414. This technique may be used in conjunction with vehicles for which changes to depth are more costly, in terms of fuel or battery life, than other navigational actions.

In at least one embodiment, distance between charge station 414 and geothermal power source 410 is adjustable. For example, the distance might be adjusted either by release of additional line 412, or by charge station 414 climbing up or down on the line 412. Adjustments to the distance allow the charge station 414 to adjust its depth to that of underwater vehicle 402, and thereby avoid depth changes that might be excessively costly to the underwater vehicle 402. The charge station 414 may use power from the power source 410 to make depth adjustments, whereas the underwater vehicle 402 may be limited by fuel or battery power.

The underwater vehicle 402 connects to the charge station 414 via a coupling 416. The coupling 416, in an embodiment, comprises a watertight, evacuable chamber in which electrical contact is made. Alternatively, various water-compatible, short distance couplings may be employed. More generally, any mechanism suitable for short-range, underwater power transfer may be employed.

In at least one embodiment, navigational techniques described in relation to FIGS. 1-3 are employed to facilitate an underwater vehicle's navigation to a charging station. In at least one embodiment, a vehicle or other device is supplied with a location of a charging station when in contact with a remote server, and then uses the navigational system described in relation to FIGS. 1-3 to navigate to the charging station. In at least one embodiment, a charging station includes a beacon similar to those described in relation to FIGS. 1-3. The vehicle, or other device, can include information in its local database that identifies features associated with the beacon, such as whether or not there is a charging station connected to or otherwise near it.

Figure 5:
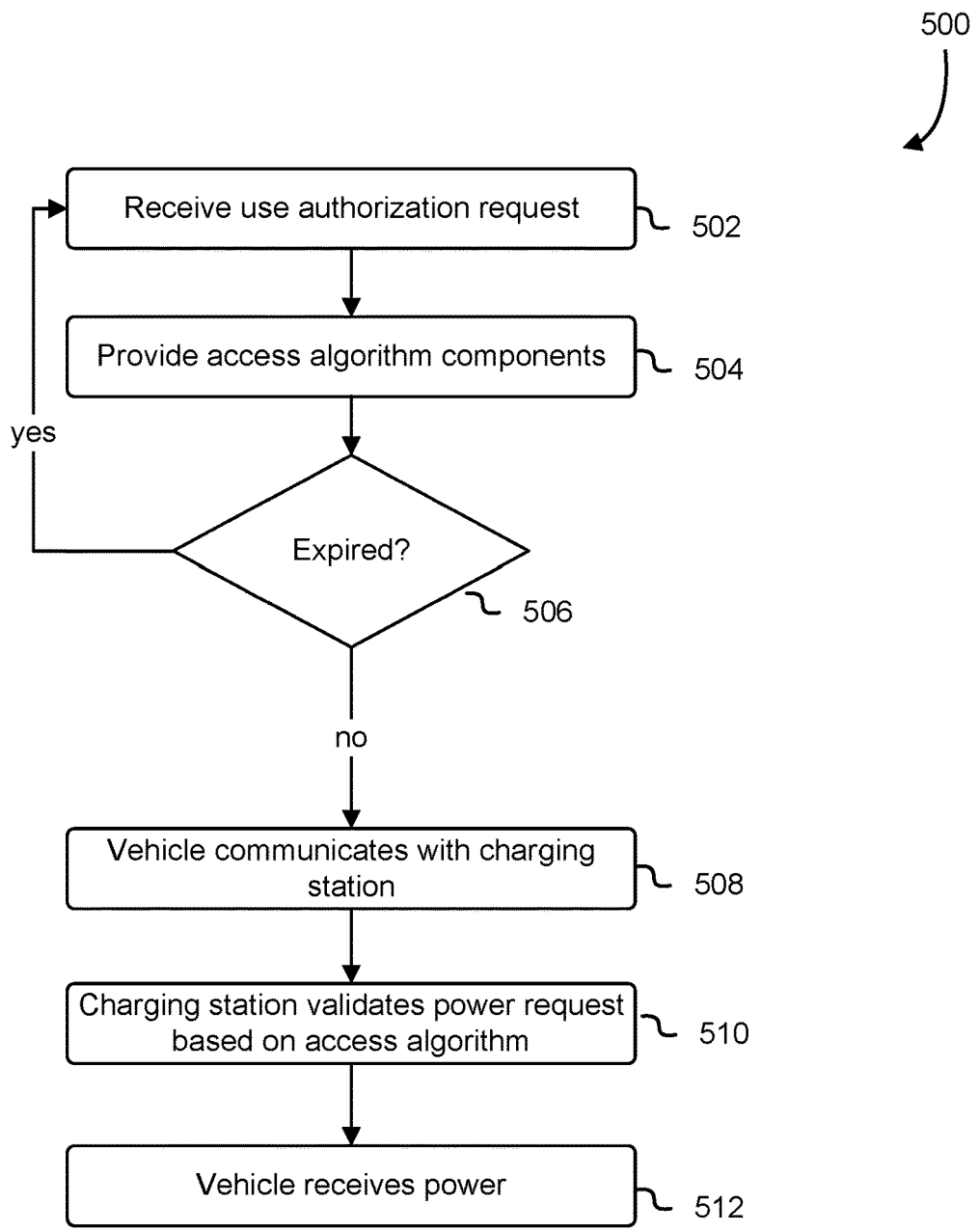
FIG. 5 illustrates an example process for authorizing use of an underwater charging station, in accordance with an embodiment.

FIG. 5 illustrates an example process 500 for authorizing use of an underwater charging station, in accordance with an embodiment. Although FIG. 5 is illustrated as a sequence of operations, it should not be construed in a manner which would limit the scope of the present disclosure to only those embodiments that conform to the depicted sequence. For example, in various embodiments, the depicted operations may be reordered or performed in parallel, except where the depicted sequence is logically required, such as when the output of one step is the input to a subsequent step.

At 502, a service provider receives a request to authorize use of a power station. The request may originate, for example, from a client device or an underwater vehicle. The request may be sent when the vehicle has surfaced, or is otherwise able to communicate with the service provider. Note that such communication may be difficult, or impossible, when the vehicle is submerged.

At 504, the service provider responds to the request by providing the underwater vehicle or other device with the components of an access algorithm. For example, the service provider may transmit, to the client or vehicle, an encryption key needed to use the algorithm, other encrypted data, computer-executable instructions to perform the algorithm, data for a database used by the algorithm, and so forth. In at least one embodiment, components of an access algorithm are obtained from a remote server and stored by a vehicle or other device for use while the vehicle or device is underwater, where communication with the remote server may be prevented by local conditions.

In at least one embodiment, the location of a charging station is provided by an algorithm, similar to the algorithm just described, that ceases to function after a predefined period of time.

At 506, a determination is made, by the underwater vehicle or other device, as to whether the access algorithm has expired. As noted, the algorithm may be time-limited, so that the access it provides to an underwater vehicle degrades or ceases over time.

In an embodiment, the access algorithm disables access to a power station after a pre-defined amount of time has elapsed since the components of the access algorithm were provided.

In an embodiment, the access algorithm provides limited access to a power station after a pre-defined amount of time has elapsed since the access components were provided. For example, the access algorithm may provide sufficient power for an underwater vehicle to surface, but not provide power sufficient for a full charge.

In at least one embodiment, an access algorithm comprises a set of instructions that are executable by a vehicle, or other device, to obtain or otherwise facilitate access to an underwater charging station. In at least one embodiment, an access algorithm comprises instructions for generating a signal to send to a charging station, such as instructions for generating an acoustic ping. In at least one embodiment, an access algorithm comprises instructions for interpreting a response to a signal returned from an underwater charging station, such as an acoustic reflection generated in response to an acoustic ping. In at least one embodiment, an access algorithm comprises instructions for determining a level of access to an underwater charging station, such as an amount of power to be provided. In at least one embodiment, the access algorithm determines whether power is to be provided, or how much power is to be provided, based on when authorization to access an underwater charging station was granted.

At 508, the underwater vehicle or other device communicates with the underwater charging station. The nature and amount of communication may be limited by the access algorithm. For example, in some cases the charging station can limit communication initially to an exchange of information provided by the access algorithm, so that the charging station can be informed regarding the level of access that is to be provided to the vehicle or other device. If at least some level of access has been granted, further communications can occur in order to facilitate a charging process.

In an embodiment, communication between an underwater vehicle and the charging station comprises a request to determine a location of the charging station. In embodiments, the location is provided if access is authorized.

In an embodiment, communication between the underwater vehicle and the charging station comprises a request to engage a coupling, such as the coupling depicted in FIG. 4. These communications may comprise fine-grained navigational details, so that the vehicle can navigate and orient itself to a position in which the coupling can occur.

In an embodiment, communication between the underwater vehicle and the charging station comprises a request to initiate power transfer. The request may further comprise information provided by the access algorithm to establish to the charging station that the requested charging level is authorized.

At 510, the charging station validates the power request, based on information provided via the access algorithm. For example, the access algorithm may retrieve authorization codes, based on the current level of access, and provide those codes to the charging station. In at least one embodiment, authorization codes are stored by the vehicle or other device, in encrypted form, in a local database. After the access algorithm retrieves the codes, they may be provided to the charging station. The charging station may then validate the provided authorization codes and determine if power should be granted. In at least one embodiment, the validity of an authorization code changes over time, so that an authorization code granted at a time $T_1$ can no longer be used, or can only be used to obtain a partial charge, at a subsequent time $T_2$.

At 512, the underwater vehicle receives power from the charging station. In at least one embodiment, power transfer includes a physical coupling between the underwater vehicle and the charging station. For example, the underwater vehicle may extend a probe into an evacuable chamber of the charging station. The chamber may then be cleared of water, and an electrical connection made between the probe and the charging station. For example, the probe may comprise an electrical plug which is inserted into an electrical socket locating within the chamber. When the chamber has been cleared of water, power transfer can occur.

In at least one embodiment, other physical connections are made, such as a magnetic connection to lock the underwater vehicle, or a probe of the vehicle, into place during the transfer of electric power. This technique may be used in conjunction with short-range, and very-short range, wireless power transfer techniques, since this may minimize power loss due to fluctuations in the positions of the charging station and the underwater vehicle. For example, currents or other flows might cause variances in the positions of the charging station and underwater vehicle. By locking the vehicle and charging station into place, the underwater power transfer can be made more efficient, even if no such physical coupling were necessary under ordinary, above-the-surface conditions. For example, this technique may be used in conjunction with inductive coupling, light-based power transfer, microwave power transmission, magneto-dynamic coupling, and so on. These techniques may perform with greater efficiency in the underwater environment if the respective positions of the charging station and underwater device is kept fixed during charging.

In another embodiment, a wireless power transmission occurs within an evacuable chamber. For example, a probe from the wireless vehicle may comprise components for receiving a wireless power transmission. The charging station may comprise an evacuable chamber into which the probe is inserted. In addition, the evacuable chamber may comprise a wireless power transmitter. The probe may be inserted into the chamber, and the chamber can be evacuated. Once evacuated, wireless power transmission can occur between the transmitter and the probe's receiver, without the impediment of water.

Once the underwater vehicle has charged, the vehicle can detach from the coupling and can then proceed with its own operation. In at least one embodiment, detaching from the coupling comprises equalizing pressure between inside the coupling and the outside environment, and opening the coupling to allow the underwater vehicle to detach from the coupling mechanism. In other embodiments, decoupling may comprise other forms of physical separation, or in some cases simply terminating the power transfer.

The present disclosure may be further understood in view of the following clauses:

1. A device, comprising:
   a transmitter to transmit a first signal to an underwater beacon, wherein the underwater beacon generates a second signal in response to the first signal;
   a receiver to receive the second signal;
   at least one processor;
   at least one memory comprising instructions that, in response to execution by the at least one processor, cause the device to at least:
   obtain, based at least in part on the second signal, information indicative of an identity of the underwater beacon;
   obtain, based at least in part on the information indicative of the identity of the underwater beacon, information indicative of a location of the underwater beacon; and
   determine, while the device is underwater, a location of the underwater device based at least in part on the information indicative of the location of the underwater beacon.

2. The device of clause 1, the at least one memory comprising further instructions that, in response to execution by the at least one processor, cause the device to at least obtain, while surfaced, information mapping from an identity of the underwater beacon to information indicative of the location of the underwater beacon.

3. The device of any of clauses 1-2, wherein the second signal is an acoustic reflection of the first signal.

4. The device of clause 3, wherein at least one of a shape, material, texture, or coating of the underwater beacon causes the underwater beacon to generate an acoustic reflection comprising a set of characteristics that is unique within an operating area of the device.

5. The device of clause 4, the at least one memory comprising further instructions that, in response to execution by the at least one processor, cause the device to at least execute a set of instructions to obtain, based on the set of characteristics, the information indicative of the location of the underwater beacon.

6. The device of clause 5, wherein the set of instructions is usable to obtain the information indicative of the location of the underwater beacon based, at least in part, on a pre-authorization to use the set of instructions, wherein the pre-authorization is verified by executing the set of instructions.

7. The device of any of clauses 1-6, the at least one memory comprising further instructions that, in response to execution by the at least one processor, cause the device to at least:
   obtain authorization to utilize a set of instructions that, in response to execution by the at least one processor, cause the device determine the location of the device, wherein accuracy of the determined location degrades based at least in part on time elapsed since the authorization was obtained.

8. A method, comprising:
placing a plurality of beacons underwater, wherein a first beacon, of the plurality of beacons, generates a signal comprising information indicative of an identity of the first beacon; and
providing information indicative of a mapping between the information indicative of the identity of the first beacon and a location of the first beacon, wherein the information indicative of the location of the first beacon is usable to a device when underwater to determine a location of the device.

9. The method of clause 8, further comprising:
providing access to a database comprising information indicative of a mapping between one or more characteristics of the signal and information indicative of the identity of the beacon.

10. The method of any of clauses 8-9, further comprising:
providing access to a database comprising information indicative of a mapping between information indicative of an identity of the first beacon and information indicative of the location of the first beacon.

11. The method of any of clauses 8-10, wherein at least one of a shape, material, or texture of the first beacon is causes the first beacon to generate an acoustic reflection that is unique within an operating area of the device.

12. The method of any of clauses 8-11, further comprising:
providing, to the device, authorization to use a set of instructions that, in response to execution by at least one processor of the device, cause the device to determine the location of the device.

13. The method of clause 12, wherein accuracy of the determined location of the device degrades based at least in part on time elapsed since the authorization was provided.

14. The method of any of clauses 12-13, wherein the device is provided with an encrypted identifier which comprises information indicative of a time at which the authorization was provided, and wherein the set of instructions uses the time at which the authorization was provided to determine an accuracy level for the information.

15. The method of any of clauses 12-14, further comprising:
providing, by a remote server, the device with data indicative of authorization to use the set of instructions, wherein the device is capable of using the set of instructions to determine its location while underwater at a depth which prevents communication with the remote server.

16. A device comprising:
at least one processor; and
a memory comprising instructions that, in response to execution by the at least one processor, cause the device to at least:
obtain, from a remote server, one or more components of an algorithm for obtaining access to an underwater charging station, the algorithm usable for obtaining access when the device is underwater at a depth which prevents communication with the remote server;
obtain, from the underwater charging station, authorization to charge the device, the authorization based at least in part on the one or more components and execution of the algorithm by the device, wherein a level of access to the underwater charging station is determined based, at least in part, on execution of the algorithm by the device; and
charge the device using the underwater charging station, according to the determined level of access.

17. The device of clause 16, wherein the one or more components comprise at least one of an authorization token, encrypted data, or a set of instructions executable by the at least one processor.

18. The device of any of clauses 16-17, wherein the determined level of access is based at least in part on time elapsed since the authorization was obtained.

19. The device of any of clauses 16-18, the memory comprising instructions that, in response to execution by the at least one processor, cause the device to at least:
determine a location of the underwater charging station based at least in part on a response to a signal generated by a beacon, wherein authorization to determine the location of the underwater charging station is obtained based at least in part on the one or more components of the access algorithm.

20. The device of any of clauses 16-19, wherein the charging station grants a level of access corresponding to at least one of providing a charge to capacity or a charge sufficient for the device to surface.

Figure 6:
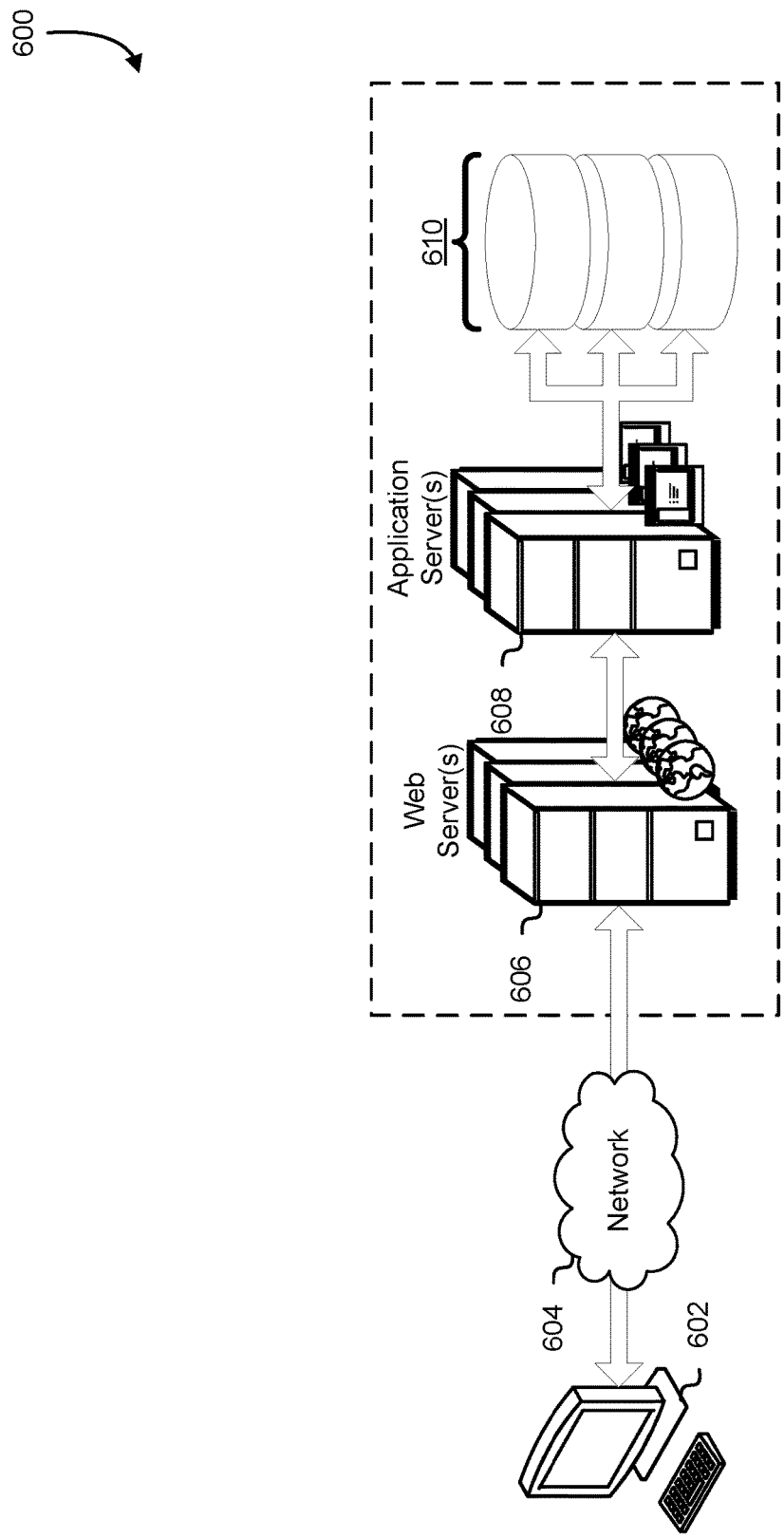
FIG. 6 illustrates a system in which aspects of various embodiments can be implemented.

FIG. 6 illustrates aspects of an example system 600 for implementing aspects in accordance with an embodiment. As will be appreciated, although a web-based system is used for purposes of explanation, different systems may be used, as appropriate, to implement various embodiments. In an embodiment, the system includes an electronic client device 602, which includes any appropriate device operable to send and/or receive requests, messages, or information over an appropriate network 604 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 606 for receiving requests and serving content in response thereto, although for other networks an alternative device serving a similar purpose could be used as would be apparent to one of ordinary skill in the art.

In an embodiment, the illustrative system includes at least one application server 608 and a data store 610, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 610, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data and user information, which are used to serve content for the production side. The data store also is shown to include a mechanism for storing log data, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 610.

The data store 610, in an embodiment, is operable, through logic associated therewith, to receive instructions from the application server 608 and obtain, update or otherwise process data in response thereto, and the application server 608 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with example, information for a particular item of interest is viewed in a dedicated page or window of the browser. It should be noted, however, that embodiments of the present disclosure are not necessarily limited to the context of web pages but are more generally applicable to processing requests in general, where the requests are not necessarily requests for content. Example requests include requests to manage and/or interact with computing resources hosted by the system 600 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 600, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 6. Thus, the depiction of the system 600 in FIG. 6 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

Figure 7:
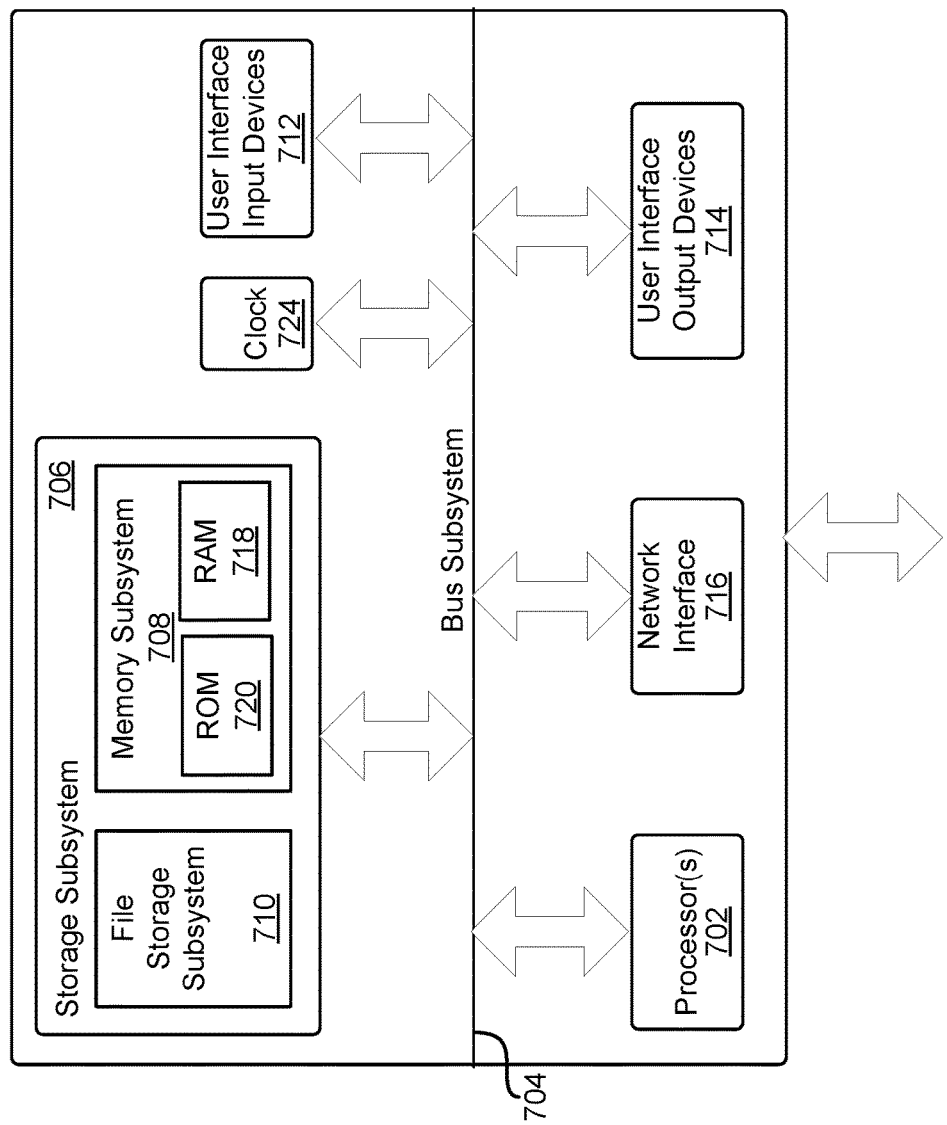
FIG. 7 illustrates an example computer system in which aspects of various embodiments can be implemented.

FIG. 7 illustrates an example computer system in which aspects of various embodiments can be implemented. In various embodiments, the computing device 700 may be used to implement any of the systems illustrated and described above. As shown in FIG. 7, embodiments of the computing device 700 include one or more processors 702 that, in embodiments, communicate with and are operatively coupled to a number of peripheral subsystems via a bus subsystem. In some embodiments, these peripheral subsystems include a storage subsystem 706, comprising a memory subsystem 708 and a file/disk storage subsystem 710, one or more user interface input devices 712, one or more user interface output devices 714, and a network interface subsystem 716. Such storage subsystem 706 may be used for temporary or long-term storage of information.

In some embodiments, the bus subsystem 704 provides a mechanism for enabling the various components and subsystems of computing device 700 to communicate with each other as intended. Although the bus subsystem 704 is shown schematically as a single bus, alternative embodiments of the bus subsystem utilize multiple buses. The network interface subsystem 716 may provide an interface to other computing devices and networks. The network interface subsystem 716 may serve as an interface for receiving data from and transmitting data to other systems from the computing device 700. In some embodiments, the bus subsystem 704 is utilized for communicating data such as details, search terms, and so on.

The user interface input devices 712 includes user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 700. In some embodiments, the one or more user interface output devices 714 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 700. The one or more user interface output devices 714 can be used, for example, to present user interfaces to facilitate user interaction with applications performing processes described and variations therein, when such interaction may be appropriate.

In some embodiments, the storage subsystem 706 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 706. These application modules or instructions can be executed by the one or more processors 702. In various embodiments, the storage subsystem 706 additionally provides a repository for storing data used in accordance with the present disclosure. In some embodiments, the storage subsystem 706 comprises a memory subsystem 708 and a file/disk storage subsystem 710.

In embodiments, the memory subsystem 708 includes a number of memories, such as a main random access memory (RAM) 718 for storage of instructions and data during program execution and/or a read only memory (ROM) 720, in which fixed instructions can be stored. In some embodiments, the file/disk storage subsystem 710 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 700 includes at least one local clock 724. The at least one local clock 724, in some embodiments, is a counter that represents the number of ticks that have transpired from a particular starting date and, in some embodiments, is located integrally within the computing device 700.

The computing device 700 could be of any of a variety of types, including a portable computer device, tablet computer, a workstation, or any other device described below. Additionally, the computing device 700 can include another device that, in some embodiments, can be connected to the computing device 700 through one or more ports (e.g., USB, a headphone jack, Lightning connector, etc.). In embodiments, such a device includes a port that accepts a fiber-optic connector. Accordingly, in some embodiments, this device is that converts optical signals to electrical signals that are transmitted through the port connecting the device to the computing device 700 for processing. Due to the ever-changing nature of computers and networks, the description of the computing device 700 depicted in FIG. 7 is intended only as a specific example for purposes of illustrating the preferred embodiment of the device. Many other configurations having more or fewer components than the system depicted in FIG. 7 are possible.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A method, comprising:
   placing a plurality of beacons underwater, wherein a first beacon, of the plurality of beacons, generates a signal comprising information indicative of an identity of the first beacon, wherein the signal is to be generated based at least in part on a permutation of at least two or more of shape, coating, texture, or material that are unique among beacons within an operating area; and
   providing information indicative of a mapping between the information indicative of the identity of the first beacon and a location of the first beacon, wherein the information indicative of the location of the first beacon is usable to a device when the device is underwater to determine a location of the device.

2. The method of claim 1, further comprising:
   providing access to a database comprising information indicative of a mapping between one or more characteristics of the signal and information indicative of the identity of the first beacon.

3. The method of claim 1, further comprising:
   providing access to a database comprising information indicative of a mapping between information indicative of an identity of the first beacon and information indicative of the location of the first beacon.

4. The method of claim 1, further comprising: providing, to the device, authorization to use a set of instructions that, in response to execution by at least one processor of the device, cause the device to determine the location of the device.

5. The method of claim 4, wherein accuracy of the determined location of the device degrades based at least in part on time elapsed since the authorization was provided.

6. The method of claim 4, wherein the device is provided with an encrypted identifier which comprises information indicative of a time at which the authorization was provided, and wherein the set of instructions uses the time at which the authorization was provided to determine an accuracy level for the information.

7. The method of claim 4, further comprising: providing, by a remote server, the device with data indicative of authorization to use the set of instructions, wherein the device is capable of using the set of instructions to determine its location while underwater at a depth which prevents communication with the remote server.

8. The method of claim 4, wherein the signal is an acoustic reflection that is unique within an operating area of the device.

9. A device, comprising:
at least one processor; and
a memory comprising instructions that, in response to execution by the at least one processor, cause the device to at least:
receive a signal comprising information indicative of an identity of a beacon, wherein the signal generated by reflection from the beacon based, at least in part, on a permutation of at least two or more of shape, coating, texture, or material that are unique among beacons within an operating area; and
use, while underwater, a mapping between the information indicative of an identity of the beacon and a location of the beacon, to determine a location of the device.

10. The device of claim 9, wherein the beacon is one of a plurality of beacons placed underwater.

11. The device of claim 9, wherein the device transmits a second signal to cause the beacon to reflect the signal.

12. The device of claim 9, wherein information indicative of the mapping is received from a remote server when the device is located at a position enabling communication with a remote server.

13. The device of claim 9, wherein a remote server authorizes the device to use the information indicative of the mapping when the device is located at a position enabling communication with a remote server.

14. A non-transitory storage medium comprising instructions that, when performed by one or more processors of a device, cause the device to:
receive a signal comprising information indicative of an identity of a beacon, wherein the received signal is based, at least in part, on a permutation of at least two or more of shape, coating, texture, or material that are unique among beacons within an operating area; and
determine a location of the beacon based, at least in part, on information indicative of a mapping between the information indicative of the identity of the beacon and a location of the beacon.

15. The non-transitory storage medium of claim 14, comprising further instructions that, when performed by the one or more processors, cause the device to:
obtain authorization to use a set of instructions that, when performed by the one or more processors, cause the device to determine the location of the device.

16. The non-transitory storage medium of claim 14, comprising further instructions that, when performed by the one or more processors, cause the device to:
transmit a second signal to cause the beacon to reflect the signal.

17. The non-transitory storage medium of claim 14, comprising further instructions that, when performed by the one or more processors, cause the device to:
receive the information indicative of the mapping from a remote server when the device is located at a position enabling communication with a remote server.

18. The non-transitory storage medium of claim 14, wherein a remote server authorizes the device to use the information indicative of the mapping when the device is located at a position enabling communication with a remote server.

19. The non-transitory storage medium of claim 14, comprising further instructions that, when performed by the one or more processors, cause the device to:
determine the location of the device based, at least in part, on two or more locations of the beacons.

* * * * *